(12) United States Patent
Yoo (10) Patent No.: US 9,725,881 B2
(45) Date of Patent: Aug. 8, 2017

(54) CHARGING SYSTEM FOR ENERGY STORAGE DEVICE OF HYBRID CONSTRUCTION MACHINERY

(71) Applicant: Doosan Infracore Co., Ltd., Incheon (KR)

(72) Inventor: Seung Jin Yoo, Seoul (KR)

(73) Assignee: Doosan Infracore Co., Ltd., Incheon (KR)

( * ) Notice: Subject to any disclaimer, the term of this patent is extended or adjusted under 35 U.S.C. 154(b) by 7 days.

(21) Appl. No.: 14/655,545

(22) PCT Filed: Dec. 24, 2013

(86) PCT No.: PCT/KR2013/012069
§ 371 (c)(1),
(2) Date: Jun. 25, 2015

(87) PCT Pub. No.: WO2014/104700
PCT Pub. Date: Jul. 3, 2014

(65) Prior Publication Data
US 2015/0368877 A1    Dec. 24, 2015

(30) Foreign Application Priority Data

Dec. 26, 2012   (KR) .................. 10-2012-0152739

(51) Int. Cl.
*H02P 3/14*   (2006.01)
*E02F 9/20*   (2006.01)
(Continued)

(52) U.S. Cl.
CPC .......... *E02F 9/2091* (2013.01); *B60W 10/06* (2013.01); *B60W 10/26* (2013.01); *B60W 20/13* (2016.01);
(Continued)

(58) Field of Classification Search
CPC .. H02J 7/00; H02J 7/14; B60W 10/24; B60W 10/26; H02P 21/34
(Continued)

(56) References Cited

U.S. PATENT DOCUMENTS 5,264,764 A * 11/1993 Kuang .................... B60K 6/46
                                                      180/65.245
5,686,807 A * 11/1997 Kusano ............... B60L 11/1803
                                                         318/432
(Continued)

FOREIGN PATENT DOCUMENTS

| CN | 102421648 A | 4/2012 |
| CN | 102459719 A | 5/2012 |

(Continued)

OTHER PUBLICATIONS

Chinese Office Action dated May 5, 2016 for Chinese Application No. 201380068036.7, 6 pages.
(Continued)

*Primary Examiner* — Bickey Dhakal
(74) *Attorney, Agent, or Firm* — John D. Veldhuis-Kroeze; Westman, Champlin & Koehler, P.A.

(57) ABSTRACT

The present disclosure relates to a charging system for an energy storage device of hybrid construction machinery, and more particularly, to a charging system for an energy storage device of hybrid construction machinery which is capable of computing an amount of regenerable energy predicted according to an operational situation of an actuator, calculating a target charging rate of the energy storage device by reflecting the computed amount of the regenerable energy, and finally, computing an amount of power generated by an engine auxiliary motor in order to compensate for a difference between a target voltage and an actual voltage of the energy storage device, in the case of charging the energy storage device of the electric hybrid construction machinery.

4 Claims, 7 Drawing Sheets

(51) Int. Cl.
*B60W 10/06* (2006.01)
*B60W 10/26* (2006.01)
*B60W 30/188* (2012.01)
*B60W 20/13* (2016.01)

(52) U.S. Cl.
CPC ... *B60W 30/1886* (2013.01); *B60W 2710/244* (2013.01); *B60Y 2200/41* (2013.01); *B60Y 2200/412* (2013.01); *Y10S 903/907* (2013.01)

(58) Field of Classification Search
USPC ......................................................... 318/376
See application file for complete search history.

(56) References Cited

U.S. PATENT DOCUMENTS

| | | | |
|---|---|---|---|
| 8,768,578 B2 * | 7/2014 | Kawashima | B60W 10/08 180/65.265 |
| 2011/0054726 A1 * | 3/2011 | Noumura | B60K 6/485 701/22 |

FOREIGN PATENT DOCUMENTS

| | | |
|---|---|---|
| CN | 102529732 A | 7/2012 |
| JP | 2009-293322 A1 | 12/2009 |
| JP | 4938153 B2 | 5/2012 |
| JP | 2012172521 A | 9/2012 |
| KR | 10-2005-0000820 A | 1/2005 |
| KR | 10-2012-0022707 A | 3/2012 |
| KR | 10-2012-0024736 A | 3/2012 |
| WO | 2010/095585 A1 | 8/2010 |
| WO | 2012160985 A1 | 11/2012 |

OTHER PUBLICATIONS

International Search Report with English Translation mailed Mar. 26, 2014 for corresponding International Application No. PCT/KR2013/012069, 5 pages.

* cited by examiner

CHARGING SYSTEM FOR ENERGY STORAGE DEVICE OF HYBRID CONSTRUCTION MACHINERY

CROSS-REFERENCE TO RELATED APPLICATION

This application is a Section 371 National Stage Application of International Application No. PCT/KR2013/012069, filed Dec. 24, 2013 and published, not in English, as WO 2014/104700 A1 on Jul. 3, 2014.

FIELD OF THE DISCLOSURE

The present disclosure relates to a charging system for an energy storage device of hybrid construction machinery, and more particularly, to a charging system for an energy storage device of hybrid construction machinery which is capable of maintaining a charging rate of the energy storage device at an appropriate level in consideration of regenerable energy when charging the energy storage device of the hybrid construction machinery provided with an electric swing apparatus.

BACKGROUND OF THE DISCLOSURE

Recently, researches on hybrid type construction equipment, which improves fuel efficiency by storing surplus power of an engine in a battery, and supplying power from the battery to the engine having insufficient power so as to cope with a rapid increase in oil price, are being actively conducted.

A system, which uses the engine and an electric motor as a common power source as described above, and has an electrical energy storage device, is referred to as a hybrid system. For example, as the hybrid system, there is a hybrid system for heavy equipment such as a hybrid vehicle, and an excavator.

Meanwhile, a general excavator system uses an engine as a power source and serves to swing or move a boom, an arm and a bucket, which are final loads, by means of hydraulic pressure. On the contrary, in the case of a hybrid excavator system, a motor and an electricity storage device are additionally installed in a general excavator, thereby improving overall efficiency of the excavator system.

Figure 1:
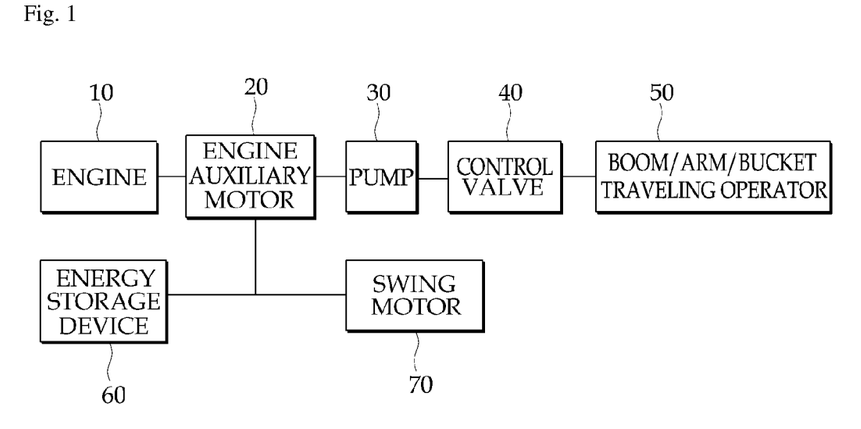
FIG. 1 is configuration diagram of a hybrid excavator to which the present disclosure is applied.

FIG. 1 is a configuration diagram of a hybrid excavator in which a swing apparatus is driven by electricity by being separated from a hydraulic power train system in the related art.

As illustrated, a swing motor 70 is driven by being supplied with electrical energy from an energy storage device 60, and the energy storage device 60 is supplied with electric power from an engine auxiliary motor 20. In a situation in which the swing motor 70 decelerates, kinetic energy of the swing apparatus is regenerated to the energy storage device 60, and regarding electric power that is lost due to friction and the like, the engine auxiliary motor 20 supplies electric power to maintain a voltage of the energy storage device 60 at an appropriate level. Meanwhile, an engine 10, a pump 30, a control valve 40, and a boom/arm/bucket traveling operator 50 are the same components as those provided in an engine type excavator in the related art.

A method of charging an energy storage device 60 of an electric hybrid construction machine in the related art is performed by dividing a voltage of the energy storage device 60 into regions that may be charged and discharged, and charging the energy storage device 60 with a predetermined target voltage independently of an operational situation of an actuator. Therefore, when supplying the same output to the actuator in a working mode in which a voltage of the energy storage device 60 is maintained at a low level, it is necessary to supply a large amount of current, and as a result, an electrical copper loss significantly occurs in proportion to the square of the current.

Meanwhile, in a working mode in which a voltage of the energy storage device 60 is maintained at a high level, regenerable energy of the swing motor 70 cannot be stored in the energy storage device 60, and the regenerable energy is radiated as thermal energy through heat generating resistant elements and the like, such that a loss of energy occurs, and as a result, fuel efficiency of the electric hybrid construction machine deteriorates. In a case in which a capacity of the energy storage device 60 is designed to be larger than necessary in order to prevent the above problem, high costs are incurred, and there is a restriction in designing the energy storage device 60 because the energy storage device 60 occupies a large volume when the energy storage device 60 is mounted in a vehicle.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter.

The present disclosure has been made in an effort to solve the aforementioned problem, and to provide a charging system for an energy storage device of hybrid construction machinery, which is capable of computing an amount of regenerable energy predicted according to an operational situation of an actuator, calculating a target charging rate of the energy storage device by reflecting the computed amount of the regenerable energy, and finally, computing an amount of power generated by an engine auxiliary motor in order to compensate for a difference between a target voltage and an actual voltage of the energy storage device, in the case of charging the energy storage device of the electric hybrid construction machinery.

Since regenerable energy according to an operational state of the actuator is reflected when calculating the target charging rate of the energy storage device, it is possible to prevent excessive charge and discharge of the energy storage device, thereby preventing disability of energy regeneration when a high voltage is applied, and preventing an electrical loss (copper loss) due to a large amount of current when a low voltage is applied, and as a result, it is possible to prevent an inefficient operation of an electric hybrid construction machine. In addition, by applying a method of efficiently charging the energy storage device proposed by the present disclosure, it is possible to prevent the energy storage device from being designed to have a large capacity, thereby allowing the energy storage device to be subject to compact mounting design.

In order to achieve the above objects, the present disclosure provides a charging system for an energy storage device of hybrid construction machinery that includes an engine, a generator, an energy storage device, and a swing motor which is driven by electrical energy of the energy storage device, the charging system including: a regenerable energy computing unit which receives at least one of a current, a voltage and a speed of the swing motor, and computes regenerable energy of the swing motor; a target voltage computing unit which computes a target voltage of the energy storage device based on the regenerable energy computed by the regenerable energy computing unit; and a control unit which computes an output amount of the generator so as to compensate for a difference between the computed target voltage of the energy storage device and an actual voltage of the energy storage device.

The regenerable energy computing unit may include: a swing power computing unit which receives at least one of a current, a voltage and a speed of the swing motor and computes swing motor power; a regenerative efficiency determining unit which determines whether to drive the swing motor and whether to regenerate energy based on whether output of the swing motor is positive or negative, and determines regenerative efficiency of the swing motor; a swing motor output integrating unit which calculates regenerable energy by integrating the swing motor output by reflecting the determined regenerative efficiency to the computed swing motor power; a resetting unit which resets a value of the swing motor output integrating unit based on information on a speed and acceleration of the swing motor; and an upper and lower limit value setting unit which sets upper and lower limit values of the regenerable energy of the swing motor in order to prevent an output value of the swing motor output integrating unit from being output as a predetermined maximum value or a negative value.

The target voltage computing unit may determine the target voltage of the energy storage device based on energy produced by subtracting the swing motor regenerable energy from energy of the energy storage device which corresponds to a maximum voltage of the energy storage device.

The control unit may determine target output of the generator by applying a difference value between the computed target voltage of the energy storage device and an actual voltage of the energy storage device to a proportion-integration-differentiation control method.

According to the present disclosure, since regenerable energy according to an operational state of the actuator is reflected when calculating the target charging rate of the energy storage device, it is possible to prevent excessive charge and discharge of the energy storage device, thereby preventing disability of energy regeneration when a high voltage is applied, and preventing an electrical loss (copper loss) due to a large amount of current when a low voltage is applied, and as a result, it is possible to prevent an inefficient operation of an electric hybrid construction machine.

In addition, by applying a method of efficiently charging the energy storage device proposed by the present disclosure, it is possible to prevent the energy storage device from being designed to have a large capacity, thereby allowing the energy storage device to be subject to compact mounting design.

DESCRIPTION OF MAIN REFERENCE
NUMERALS OF THE DRAWINGS

10: Engine
20: Engine auxiliary motor
30: Pump
40: Control valve
50: Boom/arm/bucket traveling operator
60: Energy storage device
70: Swing motor
100: Regenerable energy computing unit
110: Regenerative efficiency determining unit
120: Swing motor output integrating unit
130: Resetting unit
140: Upper and lower limit value setting unit
150: Swing power computing unit
200: Target voltage computing unit
300: Control unit

DETAILED DESCRIPTION

Hereinafter, an exemplary embodiment according to the present disclosure will be described in detail with reference to the accompanying drawings. A configuration of the present disclosure and an operation and an effect according to the configuration of the present disclosure will be clearly understood by the detailed description below. In the following detailed description, the same elements will be designated by the same reference numerals even though the elements are illustrated in different drawings, and a detailed explanation of publicly known related configurations may be omitted so as to avoid unnecessarily obscuring the subject matter of the present disclosure.

The present disclosure is applied to a hybrid excavator in which a swing apparatus as illustrated in FIG. 1 is separated from a hydraulic power train system in the related art and driven by electricity.

That is, as illustrated in FIG. 1, the present disclosure may be applied to a hybrid excavator that includes an engine 10, an engine auxiliary motor 20 which is driven by the engine 10, an energy storage device 60 which stores energy transferred from the engine auxiliary motor 20, a swing motor 70 which is driven by electrical energy of the energy storage device 60, and a pump 30 which operates an operator 50, which performs work other than a swing operation, by using driving power of the engine 10. Here, the engine auxiliary motor 20 serves as a generator, and charges the energy storage device 60 with energy.

As illustrated, the swing motor 70 in FIG. 1 is driven by being supplied with electrical energy from the energy storage device 60, and the energy storage device 60 is supplied with electric power from the engine auxiliary motor 20. In a situation in which the swing motor 70 decelerates, kinetic energy of the swing apparatus is regenerated to the energy storage device 60, and regarding energy that is lost due to friction and the like, the engine auxiliary motor 20 supplies electric power to maintain a voltage of the energy storage device 60 at an appropriate level.

Figure 2:
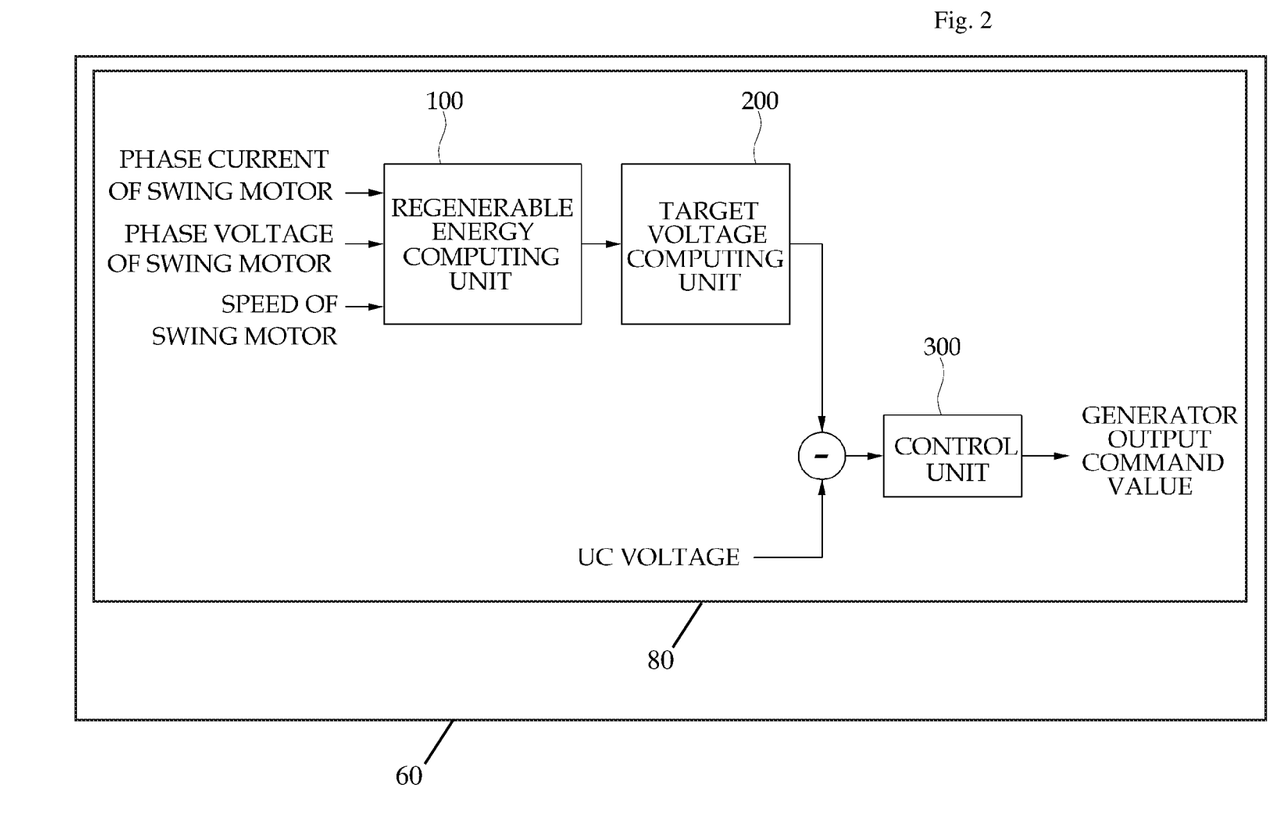
FIG. 2 is a block diagram of a charging system for an energy storage device of hybrid construction machinery according to the present disclosure.

FIG. 2 is a block diagram of a charging system 80 for the energy storage device 60 of hybrid construction machinery according to the present disclosure.

FIG. 2 illustrates a block diagram of a process in which the charging system 80 of the energy storage device 60 computes a target voltage of the energy storage device (ultra-capacitor (UC)) 60 by reflecting regenerable energy of an actuator (swing motor 70), and computes target output of the engine auxiliary motor for compensating for a difference from an actual voltage of the energy storage device 60.

As illustrated, the charging system 80 for the energy storage device 60 to which the present disclosure is applied includes a regenerable energy computing unit 100, a target voltage computing unit 200, and a control unit 300.

The regenerable energy computing unit 100 receives at least one of a current, a voltage and a speed of the swing motor 70, and computes regenerable energy of the swing motor 70.

The target voltage computing unit 200 receives the regenerable energy from the regenerable energy computing unit 100 and computes a target voltage of the energy storage device 60 based on the regenerable energy.

The control unit 300 computes an output amount of the engine auxiliary motor 20 for compensating for a difference between the target voltage of the energy storage device 60 and an actual voltage of the energy storage device 60.

Figure 3:
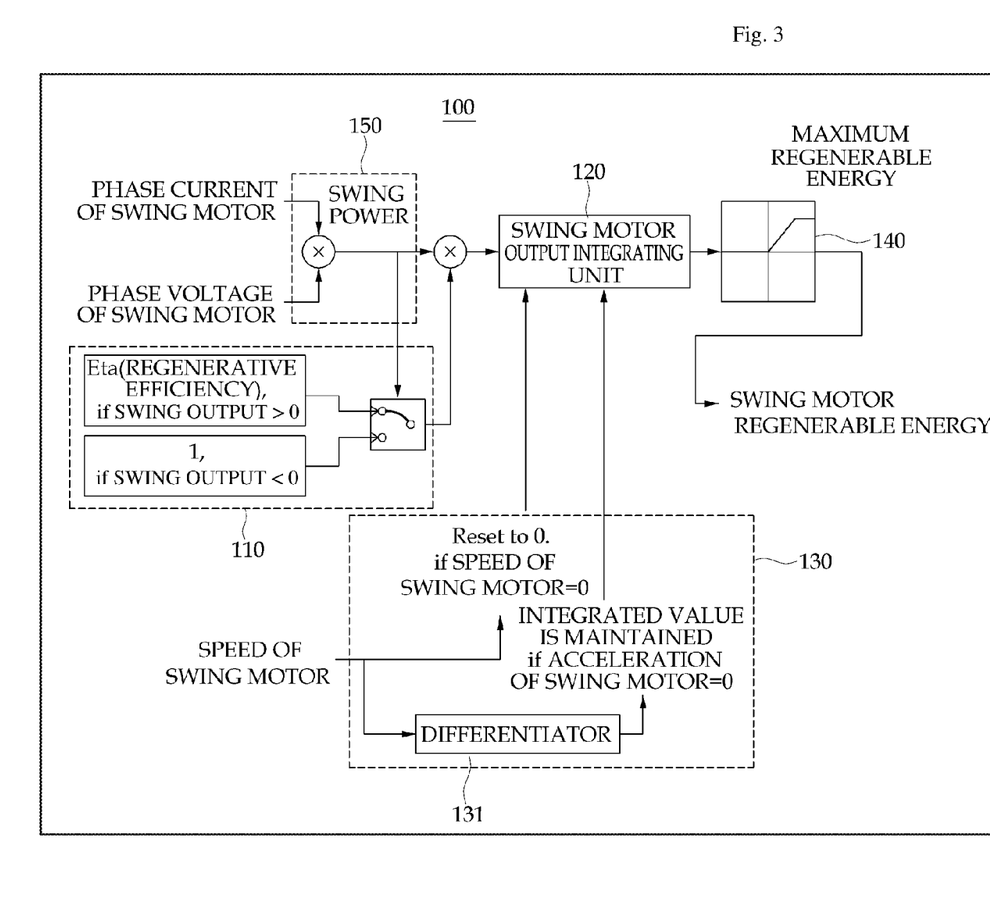
FIG. 3 is a detailed block diagram of a swing motor regenerable energy computing unit in FIG. 2 according to the present disclosure.

FIG. 3 is a detailed block diagram of a swing motor regenerable energy computing unit in FIG. 2 according to the present disclosure.

As illustrated in FIG. 3, the regenerable energy computing unit 100 includes a regenerative efficiency determining unit 110, a swing motor output integrating unit 120, a resetting unit 130, an upper and lower limit value setting unit 140, and a swing power computing unit 150.

The regenerative efficiency determining unit 110 determines whether to drive the swing motor and whether to regenerate energy based on whether output of the swing motor 70 is positive or negative, and determines swing motor output efficiency based on the determination result. Based on whether swing output is positive or negative, since a case in which the swing output is positive means that the swing motor is driven, a regenerable output proportion is computed in consideration of regenerative efficiency, and regenerable energy of the swing motor is computed by integrating the regenerable output proportion. Since a case in which the swing output is negative means the regeneration of energy, the swing motor output is integrated as it is, and the result is subtracted from the regenerable energy.

The swing motor output integrating unit 120 calculates regenerable energy by integrating the swing motor output to which efficiency of the regenerative efficiency determining unit 110 is reflected.

The resetting unit 130 resets a value of the swing motor output integrating unit 120 based on information on a speed and acceleration of the swing motor 70. That is, in order to compensate for an error caused by uncertain components due to swing friction and a loss of an electric power system during a process of calculating regenerable energy of the swing motor, the resetting unit 130 resets the swing motor regenerable energy to zero because there is no regenerable kinetic energy when the swing motor speed is zero. Further, in a case in which acceleration, that is, a differentiated value of the swing speed calculated by a differentiator 131 is zero, drive output due to friction is present, but regenerable kinetic energy is not changed, and as a result, the swing motor regenerable energy is maintained to the previous value.

The upper and lower limit value setting unit 140 sets upper and lower limit values of the regenerable energy of the swing motor in order to prevent an output value of the swing motor output integrating unit 120 from being output as a theoretical maximum value or a negative value.

The swing power computing unit 150 computes swing output from the product of a swing motor phase current and a swing motor phase voltage measured to control the swing motor 70.

It is possible to obtain a target voltage of the energy storage device 60 from the following Equation 1 by reflecting swing motor regenerable energy E calculated from the above processes.

$$E = \frac{1}{2}CV_{max}^2 - \frac{1}{2}CV_{target}^2 \quad \text{[Equation 1]}$$

Here, V max is a maximum voltage of the energy storage device 60, V target is a target voltage of the energy storage device, C is a constant of capacity of the energy storage device, and E is swing motor regenerable energy.

Figure 6:
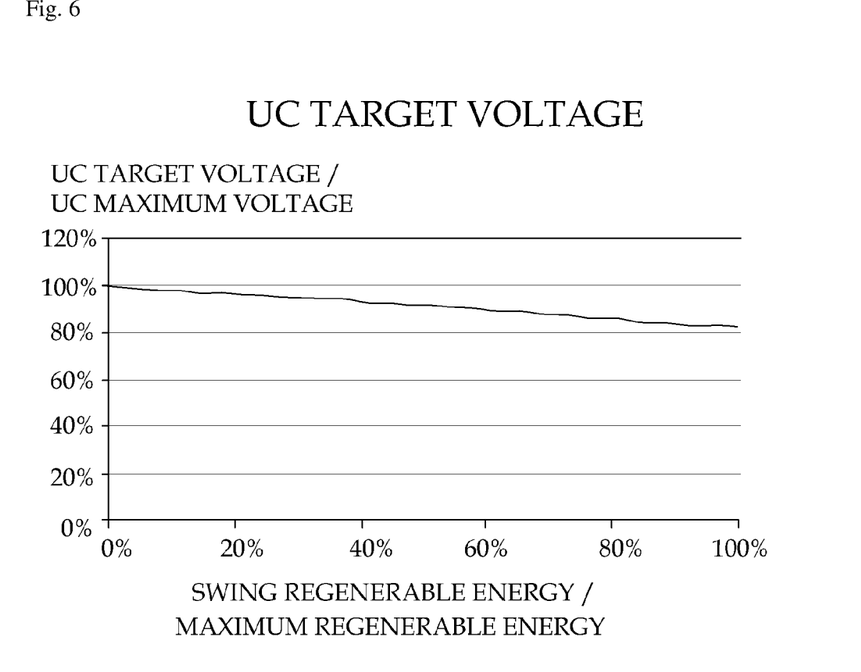
FIG. 6 is an exemplified view regarding a target voltage of the energy storage device with respect to swing regenerable energy according to the exemplary embodiment of the present disclosure.

The target voltage of the energy storage device 60 obtained from Equation 1 is indicated by the following Equation 2 and illustrated by a line drawing in FIG. 6.

$$V_{target} = \sqrt{V_{max}^2 - \frac{2E}{C}} \quad \text{[Equation 2]}$$

Here, V target is a target voltage of the energy storage device 60.

The target voltage of the energy storage device 60, which is calculated through Equation 2, is compared with a difference from an actual voltage of the energy storage device 60, and target output of the engine auxiliary motor 20 is calculated by the control unit 300 through the following Equation 3.

$$P_{generator} = \quad \text{[Equation 3]}$$
$$Kp(V_{target} - V) + Ki\int (V_{target} - V)dt + Kd\frac{d}{dt}(V_{target} - V)$$

Here, P generator is the target output of the engine auxiliary motor 20, Kp is a proportional gain, Ki is an integration gain, and Kd is a differentiation gain.

The above operation is computed by an electric power controller of the hybrid excavator in real time, and will be described with reference to flowcharts in FIGS. 4 and 5.

Figure 4:
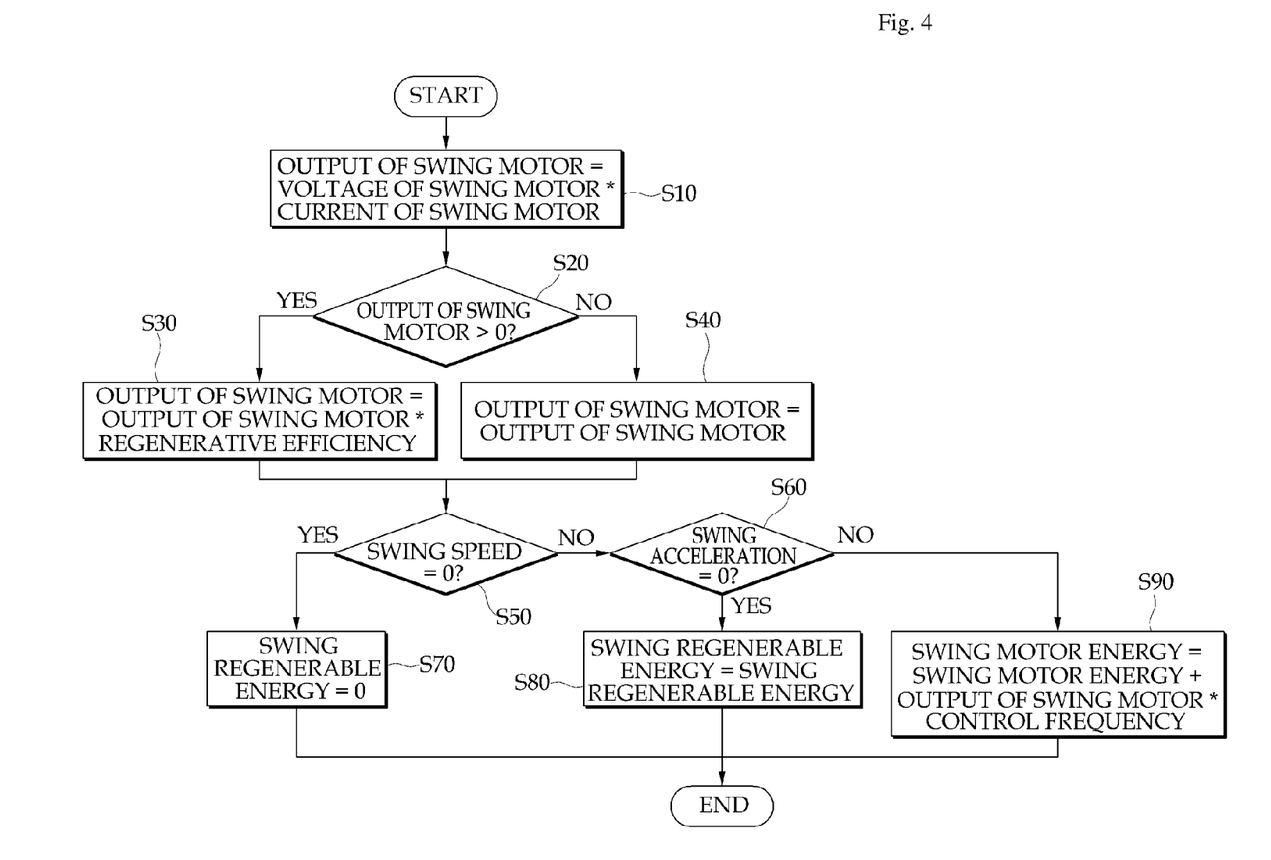
FIG. 4 is a flowchart regarding swing regenerable energy computation in the charging system for the energy storage device according to an exemplary embodiment of the present disclosure.
Figure 5:
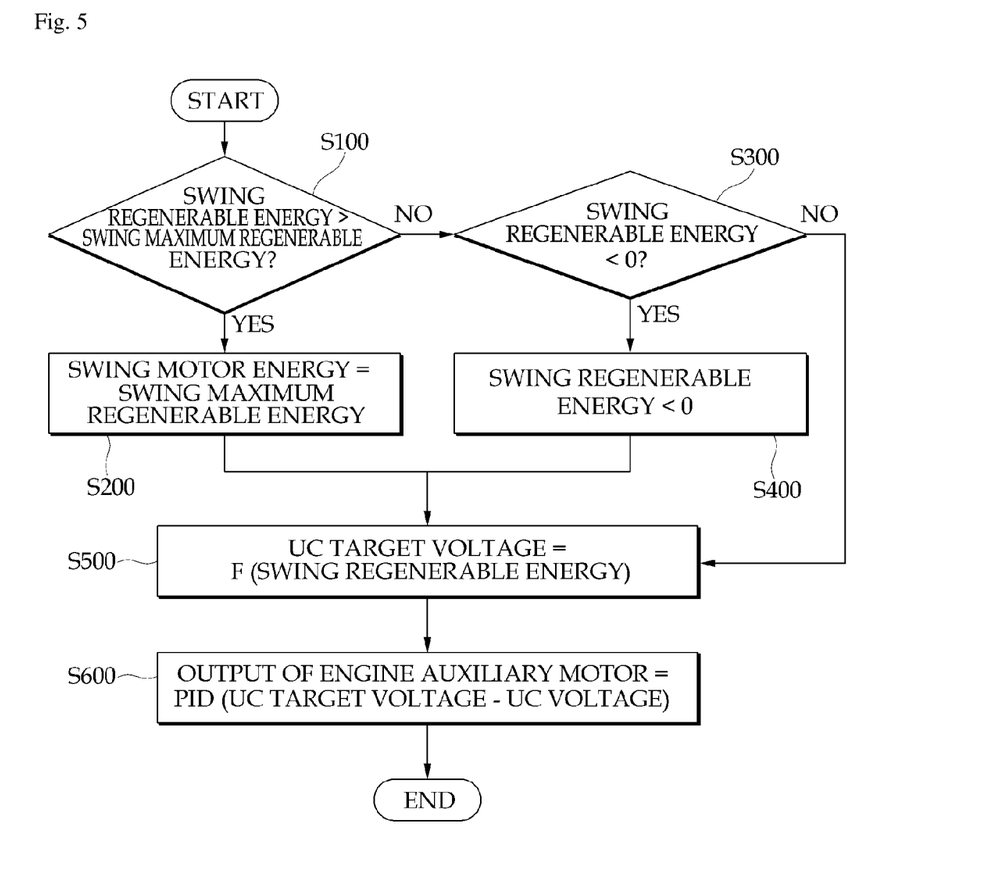
FIG. 5 is a flowchart regarding generator output command computation in the charging system for the energy storage device according to the exemplary embodiment of the present disclosure.

FIG. 4 is a flowchart regarding swing regenerable energy computation in the charging system 80 for the energy storage device 60 according to the exemplary embodiment of the present disclosure, and FIG. 5 is a flowchart regarding computation of an output command of the engine auxiliary motor 20 in the charging system for the energy storage device according to the exemplary embodiment of the present disclosure.

First, the regenerable energy computing unit 100 computes swing output from the product of a swing motor phase current and a swing motor phase voltage measured to control the swing motor (S10).

Next, based on whether swing output is determined positive or negative by the regenerative efficiency determining unit 110 (S20), since a case in which the swing output is positive means that the swing motor is driven, the regenerable energy computing unit 100 computes a regenerable output proportion in consideration of efficiency (S30), and computes regenerable energy of the swing motor by integrating the regenerable output proportion.

In contrast, since a case in which the swing output is negative means the regeneration of energy, the regenerable energy computing unit 100 integrates the swing motor output as it is, and subtracts the result from the regenerable energy (S40).

In order to compensate for an error caused by uncertain components due to swing friction and a loss of an electric power system during a process of calculating regenerable energy of the swing motor, the regenerable energy computing unit 100 confirms whether a swing motor speed is zero (S50).

When the swing motor speed is zero according to the result of the confirmation (S50), the regenerable energy computing unit 100 resets the swing motor regenerable energy to zero because no regenerable kinetic energy is present (S70).

In contrast, in a case in which the swing motor speed is not zero, the regenerable energy computing unit 100 confirms whether acceleration, that is, a differentiated value of the swing speed is zero (S60).

When the acceleration, that is, the differentiated value of the swing speed is zero according to the result of the confirmation (S60), the regenerable energy computing unit 100 maintains the swing motor regenerable energy to the previous value because drive output due to friction is present but regenerable kinetic energy is not changed (S80).

In contrast, when the acceleration, that is, the differentiated value of the swing speed is not zero according to the result of the confirmation (S60), the regenerable energy computing unit 100 computes swing regenerable energy by adding the product of swing motor output and control frequency into the swing regenerable energy (S90).

As illustrated in FIG. 5, in order to prevent a value of swing motor regenerable energy, which is obtained by integrating the swing output, from being calculated as a theoretical maximum value or more or a negative value, the charging system 80 for the energy storage device 60 sets upper and lower limit values.

The charging system 80 compares the swing regenerable energy with swing maximum regenerable energy (S100).

In a case in which the swing regenerable energy is greater than the swing maximum regenerable energy according to the result of the comparison (S100), the charging system 80 sets the swing regenerable energy to swing maximum available energy (S200).

In a case in which the swing regenerable energy is not greater than the swing maximum regenerable energy according to the result of the comparison (S100), the charging system 80 checks whether the swing regenerable energy is negative (S300), and sets the swing regenerable energy to zero when the swing regenerable energy is negative (S400). In contrast, in a case in which the swing regenerable energy is not negative, the charging system 80 computes a target voltage of the energy storage device 60 through the aforementioned Equations 1 and 2 (S500).

Further, the charging system 80 compares a difference between the calculated target voltage of the energy storage device 60 and the actual voltage of the energy storage device 60, and calculates target output of the engine auxiliary motor 20 through the above Equation 3, a relation equation of a PID controller (S600). That is, the charging system 80 may determine generator target output by applying a difference value between a target voltage of the UC and an actual voltage of the UC to a proportion-integration-differentiation (PID) control method.

Figure 7:
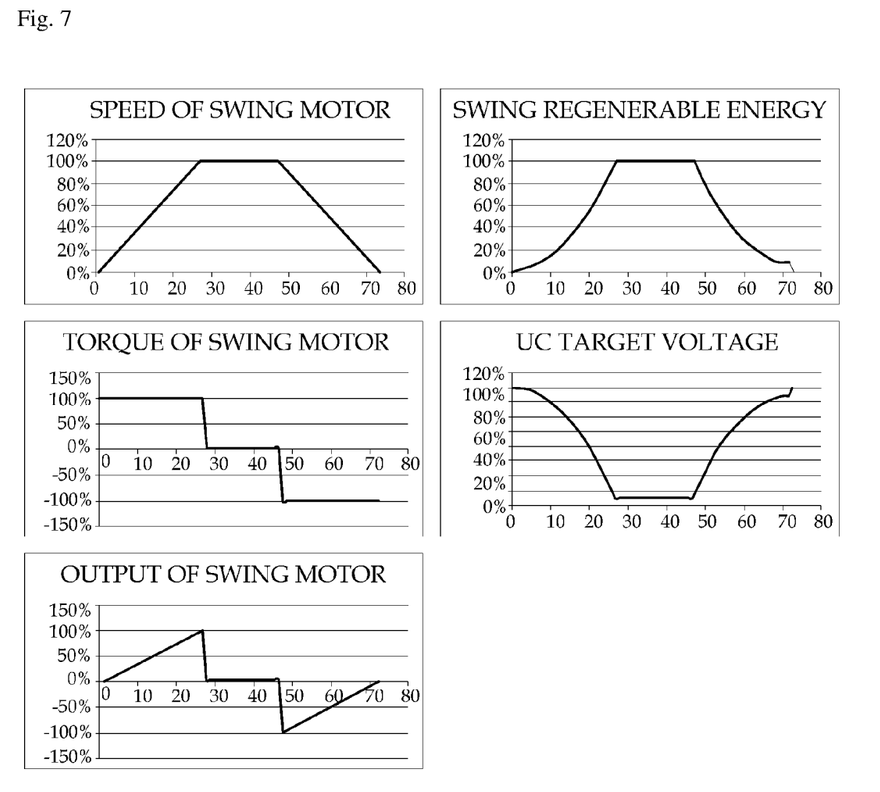
FIG. 7 is an exemplified view regarding an operation of the energy storage device with respect to swing regenerable energy according to the exemplary embodiment of the present disclosure.

FIG. 7 is an exemplified view regarding an operation of the energy storage device 60 with respect to swing regenerable energy according to the exemplary embodiment of the present disclosure.

FIG. 7 illustrates an example when the present disclosure is applied, and illustrates swing motor regenerable energy, and a target voltage of the energy storage device 60 according to a swing operation.

The swing regenerable energy is increased in a section in which the swing speed is increased, and the target voltage of the energy storage device 60 is decreased due to the increase in swing regenerable energy. In a case in which the swing speed is constant, swing output slightly occurs due to friction, or the swing regenerable energy is constantly maintained because the acceleration is zero.

In a case in which the swing motor decelerates, regenerative energy is generated, such that the swing regenerable energy is decreased, and the target voltage of the energy storage device 60 is increased. When a swing body is stopped and the swing motor speed becomes zero, no swing kinetic energy is present, such that the regenerable energy is reset to zero, and the target voltage of the energy storage device 60 is set to a maximum voltage.

From the foregoing, it will be appreciated that the exemplary embodiments of the present disclosure have been described herein for purposes of illustration, and that various modifications may be made by those skilled in the art without departing from the scope of the present disclosure. The exemplary embodiments disclosed in the specification of the present disclosure will not limit the present disclosure. The scope of the present disclosure will be interpreted by the claims below, and it will be construed that all techniques within the scope equivalent thereto belong to the scope of the present disclosure.

The invention claimed is:

1. A charging system for an energy storage device of hybrid construction machinery that includes an engine, a generator, the energy storage device, and a swing motor configured to be driven by electrical energy of the energy storage device, the charging system comprising:
   a regenerable energy computing unit, configured to:
      receive at least one of a current, a voltage and a speed of the swing motor; and
      compute a regenerable energy of the swing motor;
   a target voltage computing unit, configured to compute a target voltage of the energy storage device based on the regenerable energy computed by the regenerable energy computing unit; and
   a control unit, configured to control an output amount of the generator so as to compensate for a difference between the computed target voltage of the energy storage device and an actual voltage of the energy storage device, wherein the regenerable energy computing unit includes:
  a swing power computing unit, configured to:
    receive at least one of the current and the voltage of the swing motor; and
    compute swing motor power according to at least one of the current and the voltage of the swing motor;
  a regenerative efficiency determining unit, configured to:
    determine whether to drive the swing motor and whether to regenerate energy based on whether output of the swing motor is positive or negative; and
    determine regenerative efficiency of the swing motor according to the determination of whether to drive the swing motor and whether to regenerate energy; and
  a swing motor output integrating unit configured to calculate the regenerable energy by integrating the swing motor output by reflecting the determined regenerative efficiency to the computed swing motor power.

2. The charging system of claim 1, wherein the regenerable energy computing unit further includes:

a resetting unit, configured to reset a value of the swing motor output integrating unit based on information on the speed and an acceleration of the swing motor; and an upper and lower limit value setting unit, configured to set upper and lower limit values of the regenerable energy of the swing motor in order to prevent an output value of the swing motor output integrating unit from being outputted as a predetermined maximum value or a negative value.

3. The charging system of claim 1, wherein the target voltage computing unit is configured to determine the target voltage of the energy storage device based on energy produced by subtracting the swing motor regenerable energy from energy of the energy storage device which corresponds to a maximum voltage of the energy storage device.

4. The charging system of claim 1, wherein the control unit is configured to control target output of the generator by applying the difference between the computed target voltage of the energy storage device and the actual voltage of the energy storage device to a proportion-integration-differentiation control method.

* * * * *

UNITED STATES PATENT AND TRADEMARK OFFICE
CERTIFICATE OF CORRECTION

PATENT NO. : 9,725,881 B2  
APPLICATION NO. : 14/655545  
DATED : August 8, 2017  
INVENTOR(S) : Seung Jin Yoo Page 1 of 1

It is certified that error appears in the above-identified patent and that said Letters Patent is hereby corrected as shown below:

On the Title Page

Item (56) References Cited, Foreign Patent Documents section:
Please delete the reference "CN 1024597fi9 A" and insert --CN 102459769 A--

Signed and Sealed this
Thirteenth Day of February, 2018

Andrei Iancu
*Director of the United States Patent and Trademark Office*